(12) United States Patent
Ponukumati et al.

(10) Patent No.: US 9,706,377 B2
(45) Date of Patent: Jul. 11, 2017

(54) EMERGENCY MESSAGE SUPPORT WITH DYNAMIC PRIORITIES IN DUAL SUBSCRIBER IDENTITY MODULE DUAL STANDBY DEVICES

(71) Applicant: QUALCOMM Incorporated, San Diego, CA (US)

(72) Inventors: Dhananjaya Sarma Ponukumati, Hyderabad (IN); Bhanu Kiran Janga, Hyderabad (IN); Sitaramanjaneyulu Kanamarlapudi, San Diego, CA (US); Vikas Gulati, Hyderabad (IN); Krishna Rekhani, Hyderabad (IN); Sumanth Kumar Kota, Hyderabad (IN); Krishna Chaitanya Bellam, Hyderabad (IN); Yongsheng Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 14/861,196

(22) Filed: Sep. 22, 2015

(65) Prior Publication Data

US 2017/0086046 A1 Mar. 23, 2017

(51) Int. Cl.
*H04M 11/04* (2006.01)
*H04W 4/00* (2009.01)
(Continued)

(52) U.S. Cl.
CPC .............. *H04W 4/22* (2013.01); *H04L 51/26* (2013.01); *H04L 65/4076* (2013.01);
(Continued)

(58) Field of Classification Search
None
See application file for complete search history.

(56) References Cited

U.S. PATENT DOCUMENTS 8,892,137 B2 11/2014 Hanchate et al.
2005/0037728 A1 2/2005 Binzel et al.
(Continued)

OTHER PUBLICATIONS

"3rd Generation Partnership Project; Technical Specification Group GSM/EDGE Radio Access Network; Base Station Controller—Cell Broadcast Centre (BSC-CBC) interface specification; Cell Broadcast Service Protocol (CBSP) (Release 12)", A 3GPP Standard; 3GPP TS 48.049, 3rd Generation Partnership Project (3GPP), Mobile Competence Centre; 650, Route Des Lucioles; F-06921 Sophia-Antipolis Cedex; France, vol. Geran WG2, No. V12.0.0, Sep. 24, 2014 (Sep. 24, 2014), pp. 1-55, XP050925894, [retrieved on Sep. 24, 2014.
(Continued)

*Primary Examiner* — Moustapha Diaby
(74) *Attorney, Agent, or Firm* — Changwoo Yang (57) ABSTRACT

A method for supporting emergency cell broadcast (CB) messages on a multi-subscriber identity module (SIM) mobile communication device includes: waking up a first subscription from a sleep mode at a common traffic channel (CTCH) occasion; decoding a CB message header received during the CTCH occasion; determining whether a scheduling message (SM) is present based on the decoded CB message header; and in response to determining that the SM is present, granting resource priority to the first subscription to decode the complete SM.

20 Claims, 4 Drawing Sheets

(51) Int. Cl.
  *H04W 4/22*  (2009.01)
  *H04W 76/04*  (2009.01)
  *H04W 4/12*  (2009.01)
  *H04L 29/06*  (2006.01)
  *H04L 12/58*  (2006.01)
  *H04W 76/00*  (2009.01)
  *H04W 4/06*  (2009.01)
  *H04W 88/06*  (2009.01)

(52) U.S. Cl.
  CPC .......... *H04W 4/12* (2013.01); *H04W 76/007* (2013.01); *H04W 76/048* (2013.01); *H04W 4/06* (2013.01); *H04W 88/06* (2013.01)

(56) References Cited

U.S. PATENT DOCUMENTS

| | | | |
|---|---|---|---|
| 2012/0294169 A1 | 11/2012 | Chui et al. | |
| 2013/0203461 A1* | 8/2013 | Li | H04W 88/06 |
| | | | 455/552.1 |
| 2014/0348072 A1* | 11/2014 | May-Weymann | H04W 68/005 |
| | | | 370/329 |
| 2015/0056988 A1 | 2/2015 | Goel et al. | |
| 2015/0098379 A1 | 4/2015 | Lunden et al. | |
| 2015/0111588 A1 | 4/2015 | Dhanda et al. | |
| 2015/0119103 A1 | 4/2015 | Ngai et al. | |

OTHER PUBLICATIONS

"3rd Generation Partnership Project; Technical Specification Group Services and System Aspects; Earthquake and Tsunami Warning System (ETWS) requirements; Stage 1 (Release 9)", 3GPP Standard; 3GPP TS 22.168, 3rd Generation Partnership Project (3GPP), Mobile Competence Centre; 650, Route Des Lucioles; F-06921 Sophia-Antipolis Cedex; France, vol. SAWG1, No. V9.0.0, Jun. 10, 2008 (Jun. 10, 2008), pp. 1-12, XP051124059, [retrieved on Jun. 10, 2008].

International Search Report and Written Opinion—PCT/US2016/047901—ISA/EPO—Nov. 23, 2016.

* cited by examiner

EMERGENCY MESSAGE SUPPORT WITH DYNAMIC PRIORITIES IN DUAL SUBSCRIBER IDENTITY MODULE DUAL STANDBY DEVICES

BACKGROUND

Wideband code division multiple access (WCDMA) supports two modes of cell broadcast service (CBS) operation: 1) discontinuous receive (DRX) mode where a scheduling message (SM) pattern is known by a subscription; and 2) non-DRX mode where the subscription has no knowledge of the SM pattern and continuously decodes the secondary common control physical channel (SCCPCH) and common traffic channel (CTCH) for CBS messages. The CBS messages may be, for example, Earthquake and Tsunami Warning System (ETWS)/Cominercial Mobile Alert Service (CMAS) messages.

SUMMARY

Apparatuses and methods for providing dynamic priorities for CBS messages are provided.

According to various embodiments there is provided a method for supporting emergency cell broadcast (CB) messages on a multi-subscriber identity module (SIM) mobile communication device. In some embodiments, the method may include: waking up a first subscription from a sleep mode at a common traffic channel (CTCH) occasion; decoding a CB message header received during the CTCH occasion; determining whether a scheduling message (SM) is present based on the decoded CB message header; and in response to determining that the SM is present, granting resource priority to the first subscription to decode the complete SM.

According to various embodiments there is provided a mobile communication device. In some embodiments, the mobile communication device may include: a communication unit configured to communicate with a plurality of communication networks; and a control unit in electrical communication with the communication unit.

The control unit may be configured to: wake up a first subscription from a sleep mode at a common traffic channel (CTCH) occasion; cause the communication unit to decode a cell broadcast (CB) message header received during the CTCH occasion; determine whether a scheduling message (SM) is present based on the decoded CB message header; and in response to determining the SM is present, grant resource priority for the communication unit to the first subscription to decode the complete SM.

According to various embodiments there is provided a method for prioritizing resources for decoding a cell broadcast (CB) message on a multi-subscriber identity module (SIM) mobile communication device. In some embodiments, the method may include: decoding a message header of the CB message received on a first subscription; determining, based on the decoded message header, a CB message type; and based on the type of the CB message, prioritizing the resources of the mobile communication device for the first subscription to completely decode the CB message According to various embodiments there is provided an apparatus for prioritizing resources for decoding a cell broadcast (CB) message on a mobile communication device. In some embodiments, the mobile communication device may include: a communication unit configured to communicate with a plurality of communication networks; and a control unit in electrical communication with the communication unit.

The control unit may be configured to: cause the communication unit to decode a message header of the CB message received on a first subscription; determine, based on the decoded message header, a CB message type; and based on the type of the CB message, prioritize the resources of the mobile communication device for the first subscription to completely decode the CB message.

Other features and advantages of the various embodiments should be apparent from the following description which illustrates by way of example aspects of the various embodiments.

BRIEF DESCRIPTION OF THE DRAWINGS

Aspects and features of the various embodiments will be more apparent by describing example embodiments with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Figure 1A:
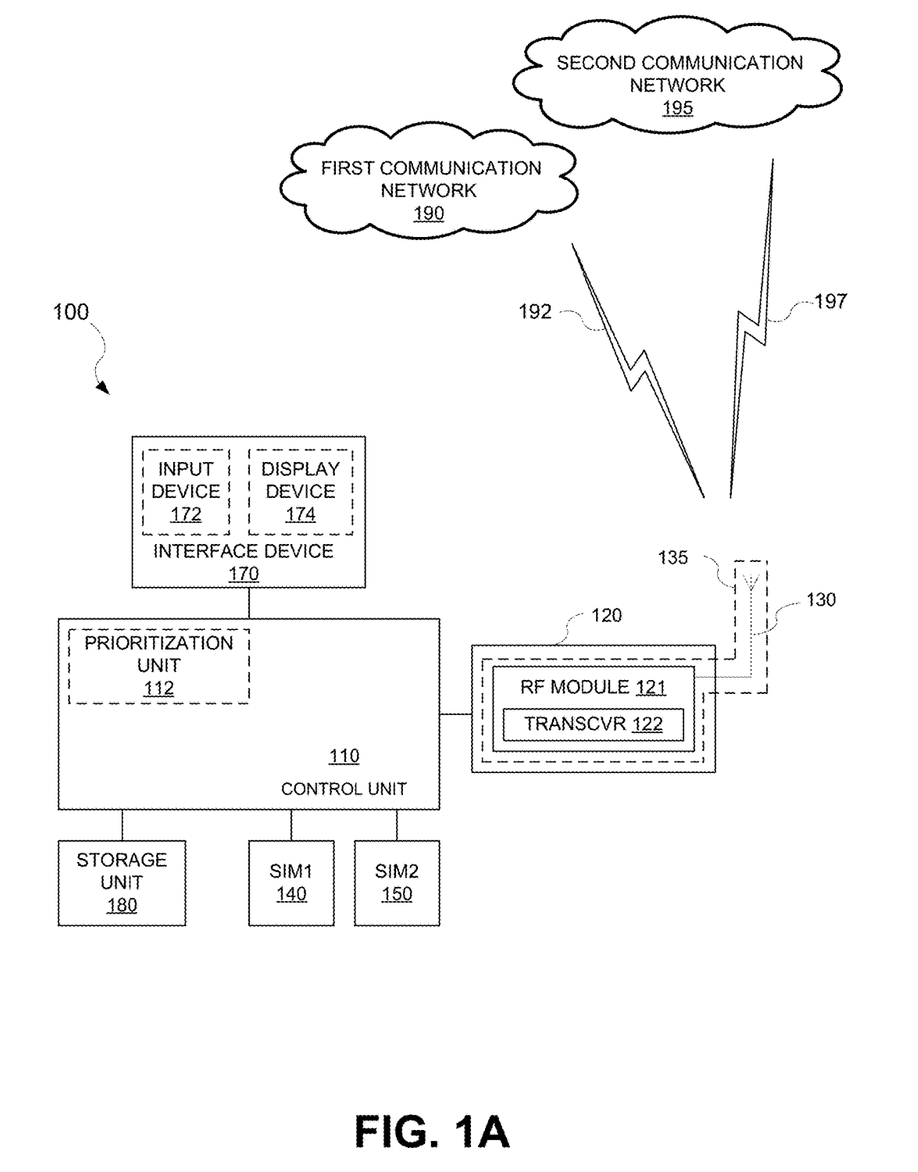
FIG. 1A is a block diagram illustrating a mobile communication device according to various embodiments.

FIG. 1A is a block diagram illustrating a mobile communication device 100 according to various embodiments. As illustrated in FIG. 1A, the mobile communication device 100 may include a control unit 110, a communication unit 120, an antenna 130, a first SIM 140, a second SIM 150, a user interface device 170, and a storage unit 180.

The mobile communication device 100 may be, for example but not limited to, a mobile telephone, smartphone, tablet, computer, etc., capable of communications with one or more wireless networks. One of ordinary skill in the art will appreciate that the mobile communication device 100 may include one or more transceivers (communication units) and may interface with one or more antennas without departing from the scope of the various embodiments.

The communication unit 120 may include, for example, but not limited to, an RF module 121. The RF module 121 may include, for example, but not limited to the first transceiver 122. An RF chain 135 may include, for example, but not limited to the antenna 130 and the RE module 121.

One of ordinary skill in the art will appreciate that embodiments of the mobile communication device 100 may include more than one communication unit and/or more than one antenna without departing from the scope of the various embodiments.

A SIM (for example the first SIM 140 and/or the second SIM 150 in various embodiments may be a universal integrated circuit card (UICC) that is configured with SIM and/or universal SIM (USIM) applications, enabling access to global system for mobile communications (GSM) and/or universal mobile telecommunications system (UMTS) networks. The UICC may also provide storage for a phone book and other applications. Alternatively, in a code division multiple access (CDMA) network, a SIM may be a UICC removable user identity module (R-UIM) or a CDMA subscriber identity module (CSIM) on a card. A SIM card may have a CPU, ROM, RAM, EEPROM and I/O circuits. An integrated circuit card identity (ICCID) SIM serial number may be printed on the SIM card for identification. However, a SIM may be implemented within a portion of memory of the mobile communication device 100, and thus need not be a separate or removable circuit, chip, or card.

A SIM used in various embodiments may store user account information, an international mobile subscriber identity (IMSI), a set of SIM application toolkit (SAT) commands, and other network provisioning information, as well as provide storage space for phone book database of the user's contacts. As part of the network provisioning information, a SIM may store home identifiers (e.g., a system identification number (SID)/network identification number (NID) pair, a home public land mobile network (HPLMN) code, etc.) to indicate the SIM card network operator provider.

The first SIM 140 may associate the communication unit 120 with a first subscription (Sub1) 192 associated with a first radio access technology (RAT) on a first communication network 190 and the second SIM 150 may associate the communication unit 120 with a second subscription (Sub2) 197 associated with a second RAT on a second communication network 195. When a RAT is active, the communication unit 120 receives and transmits signals on the active RAT. When a RAT is idle, the communication unit 120 receives but does not transmit signals on the idle RAT.

For convenience, the various embodiments are described in terms of dual SIM dual standby (DSDS) mobile communication devices. However, one of ordinary skill in the art will appreciate that the present concepts may be extended to Multi-SIM Multi-Standby (MSMS) and/or Multi-SIM Multi-Active (MSMA) mobile communication devices without departing from the scope of protection.

The first communication network 190 and the second communication network 195 may be operated by the same or different service providers, and/or may support the same or different RATs, for example, but not limited to, GSM, CDMA, WCDMA, and long term evolution (LTE).

The user interface device 170 may include an input device 172, for example, but not limited to a keyboard, touch panel, or other human interface device, and a display device 174, for example, but not limited to, a liquid crystal display (LCD), light emitting diode (LED) display, or other video display. One of ordinary skill in the art will appreciate that other input and display devices may be used without departing from the scope of the various embodiments.

The control unit 110 may be configured to control overall operation of the mobile communication device 100 including control of the communication unit 120, the user interface device 170, and the storage unit 180. The control unit 110 may be a programmable device, for example, but not limited to, a microprocessor (e.g., general-purpose processor, baseband modem processor, etc.) or microcontroller.

The control of unit 110 may include a prioritization unit 112 configured to prioritize receive cell broadcast (CB) messages based on a message type detected in the CB message header. Alternatively, the prioritization unit 112 may be implemented as electronic circuitry separate from the control unit 110. The prioritization unit 112 may assign priority to various message types.

The storage unit 180 may be configured to store operating systems and/or application programs for operation of the mobile communication device 100 that are executed by the control unit 110, as well as to store application data and user data.

Figure 1B:
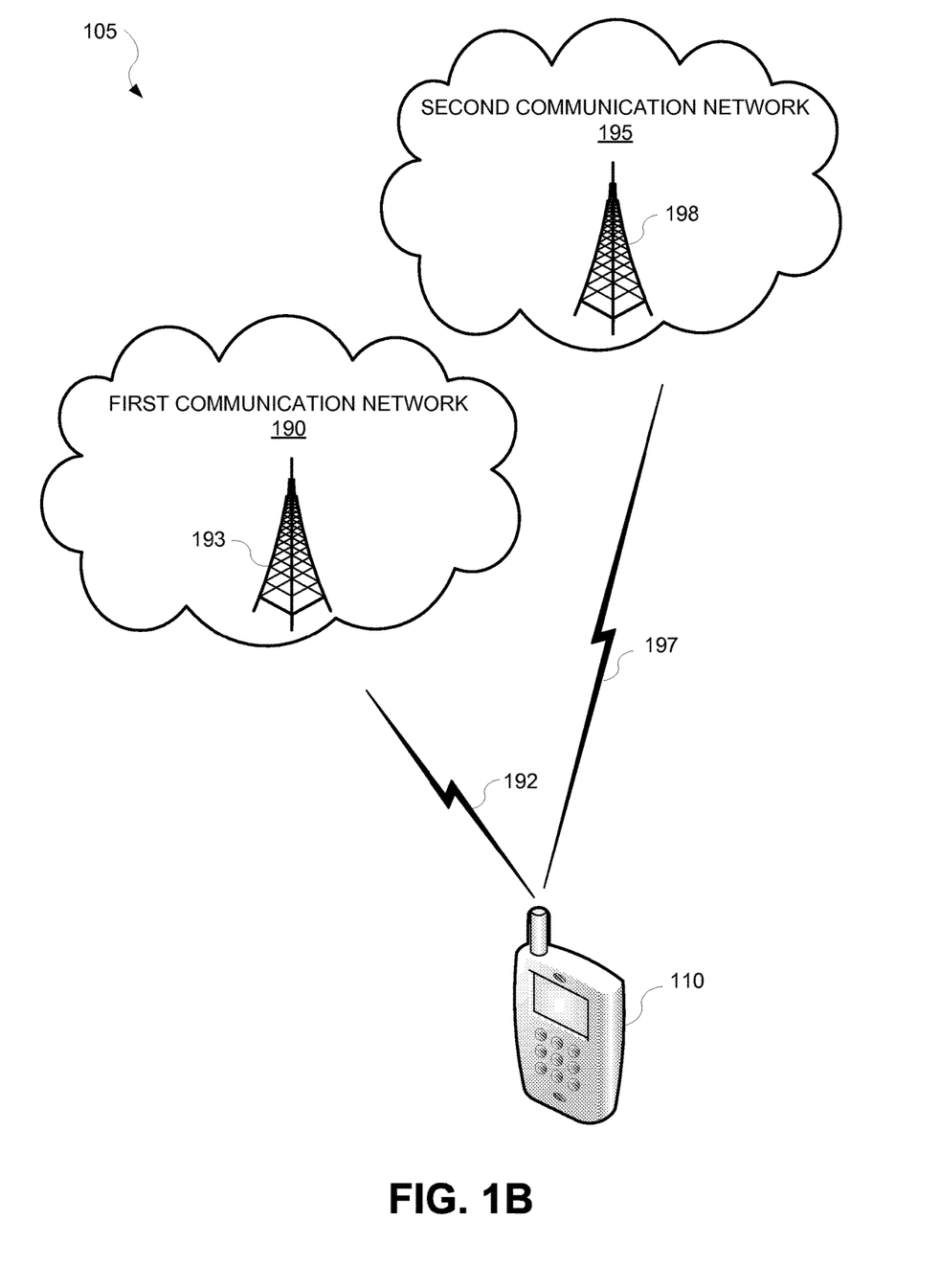
FIG. 1B is a diagram illustrating a network environment for various embodiments.

FIG. 1B is a diagram illustrating a network environment 105 for various embodiments. Referring to FIGS. 1A and 1B, a mobile communication device 100 may be configured to communicate with a first communication network 190 on a first subscription 192 and a second communication network 195 on a second subscription 197. One of ordinary skill in the art will appreciate that the mobile communication device may configured to communicate with more than two communication networks and may communicate on more than two subscriptions without departing from the scope of the various embodiments.

The first communication network 190 and the second communication network 195 may implement the same or different radio access technologies (RATs). For example, the first communication network 190 may be a GSM network and the first subscription 192 may be a GSM subscription. The second communication network 195 may also be a GSM network. Alternatively, the second communication network 195 may implement another RAT including, for example, but not limited to, Long Term Evolution (LTE), Wideband Code Division Multiple Access (WCDMA), and Time Division-Synchronous Code Division Multiple Access (TD-SCDMA).

The first communication network 190 may include one or more base transceiver stations (BTSs) including, for example, but not limited to, a first BTS 193. The second communication network 195 may also include one or more BTSs, including, for example, but not limited to, a second BTS 198. A person having ordinary skill in the art will appreciate that the network environment 105 may include any number of communication networks, mobile communication devices, and BTSs without departing from the scope of the various embodiments.

The mobile communication device 100 may attempt to acquire the first communication network 190 and camp on the first BTS 193. The mobile communication device 100 may also attempt to acquire the second communication network 195 and camp on the second BTS 198. A person having ordinary skill in the art will appreciate that the acquisition of the first communication network 190 performed on the first subscription 192 may be independent of the acquisition of the second communication network 195 performed on the second subscription 197. Furthermore, the mobile communication device 100 may attempt to acquire the first communication network 190 on the first subscription 192 and the second communication network 195 on the second subscription 197.

The control unit 110 may be configured to cause a subscription (e.g., Sub1 192, or Sub2 197) to transition from non-DRX mode to DRX mode. In non-DRX mode, a subscription may have no knowledge of a CBS scheduling pattern. The control unit 110 may cause the subscription to wake up for every CTCH occasion to decode the CTCH to determine if CBS messages are present. On the other hand, in DRX mode, the subscription knows the CBS scheduling pattern, either from information received in the system information blocks (SIBs) when the mobile communication device 100 initially camped on the network, or from information received in a previously decoded SM. Therefore, in DRX mode, the control unit 110 may cause the subscription to only wake up to decode a next SM or a scheduled CB message.

The control unit 110 (e.g., the prioritization unit 112) may assign resource priority to a subscription based on the type of CB message received by communication unit 120 on the subscription. For example, the control unit 110 may detect on one subscription (e.g., Sub1 192) a CB message header corresponding to an emergency CB message or an SM, and may detect on another subscription (e.g., Sub2 197) a CB message header corresponding to a non-emergency CB message or a paging message. Each of the CB messages may require several CTCH occasions in order to completely decode the CB message.

The control unit 110 may assign (e.g., via the prioritization unit 112) a highest message priority to an emergency CB message (e.g., an ETWS/CMAS message), a next highest message priority to an SM, a message priority lower than the SM message priority for a paging message, and the lowest message priority for a non-emergency CB message. For example, the control unit 110 may assign (e.g., via the prioritization unit 112) a higher message priority to an SM received on Sub1 192 compared to a paging CB message received on Sub2 197. The prioritization unit 112 may dynamically assign priority to various message types in real time.

The control unit 110 may grant resource priority to a subscription based on the message priority of the CB message. For example, if an SM received on Sub1 192 conflicts (i.e., overlaps) with a paging message received on Sub2 197 during the several CTCH occasions required to decode the SM, the control unit 110 may grant resource priority to Sub1 192 to completely decode the SM without permitting interruption by Sub2 197 to decode the paging message. If Sub1 192 was in non-DRX mode when the SM was received, the control unit 110 may cause Sub1 192 to transition to DRX mode after decoding the SM.

Figure 2:
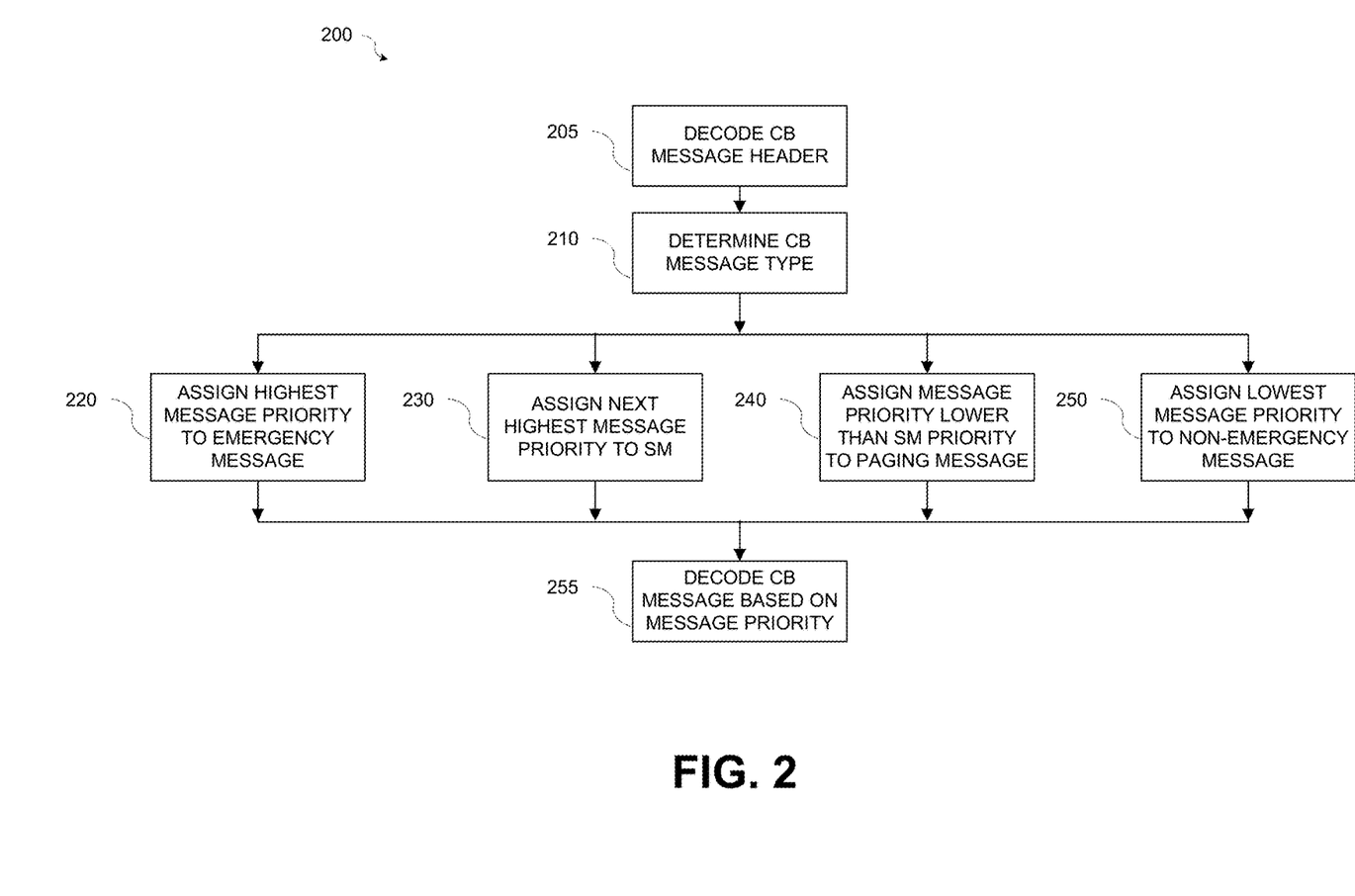
FIG. 2 is a flowchart illustrating a method for assigning message priorities to CB messages according to various embodiments.

FIG. 2 is a flowchart illustrating a method 200 for assigning message priorities to CB messages according to various embodiments. Referring to FIG. 1A-2, at block 205, the control unit 110 may cause the communication unit 120 to decode a CB message header received by a subscription (e.g., Sub1 192) on the CTCH. At block 210, the control unit 110 may determine based on the decoded CB message header the message type of the CB message.

In response to determining that the CB message is an emergency message, at block 220, the control unit 110 may assign (e.g., via the prioritization unit 112) a highest message priority (first priority) to the emergency CB message. At block 230, in response to determining that the CB message is an SM, the control unit 110 may assign a next highest message priority (second priority) to the SM. At block 240, in response to determining that the CB message is a paging message, the control unit 110 may assign a message priority (third priority) that is lower than the SM priority to the paging message. At block 250, in response to determining that the CB message is a non-emergency message, the control unit 110 may assign a lowest message priority (fourth priority) to the non-emergency message.

At block 255, the control unit 110 may cause the communication unit 120 to completely decode the received CB message having a higher message priority. For example, the control unit 110 may grant resource priority to a subscription (e.g., Sub1 192) that receives a CB message having a higher message priority than a CB message received on another subscription Sub2 197). The control unit 110 may then cause the communication unit 120 to completely decode the CB message with the higher message priority without interruption from another subscription (e.g., Sub2 197) to decode a CB message having a lower message priority. In some cases, an SM received on Sub1 192 may overlap with a paging message received on of Sub2 197. When an SM and a paging message overlap, the control unit 110 may completely decode the SM received on Sub1 192.

In some cases, a paging message received on Sub2 197 may overlap with a non-emergency CB message received on Sub1 192. When a paging message and a non-emergency CB message overlap, the control unit 110 may cause the communication unit 120 to completely decode the paging message. The control unit 110 may completely decode non-emergency CB messages on Sub1 192 after completely decoding the paging message on Sub2 197.

Figure 3:
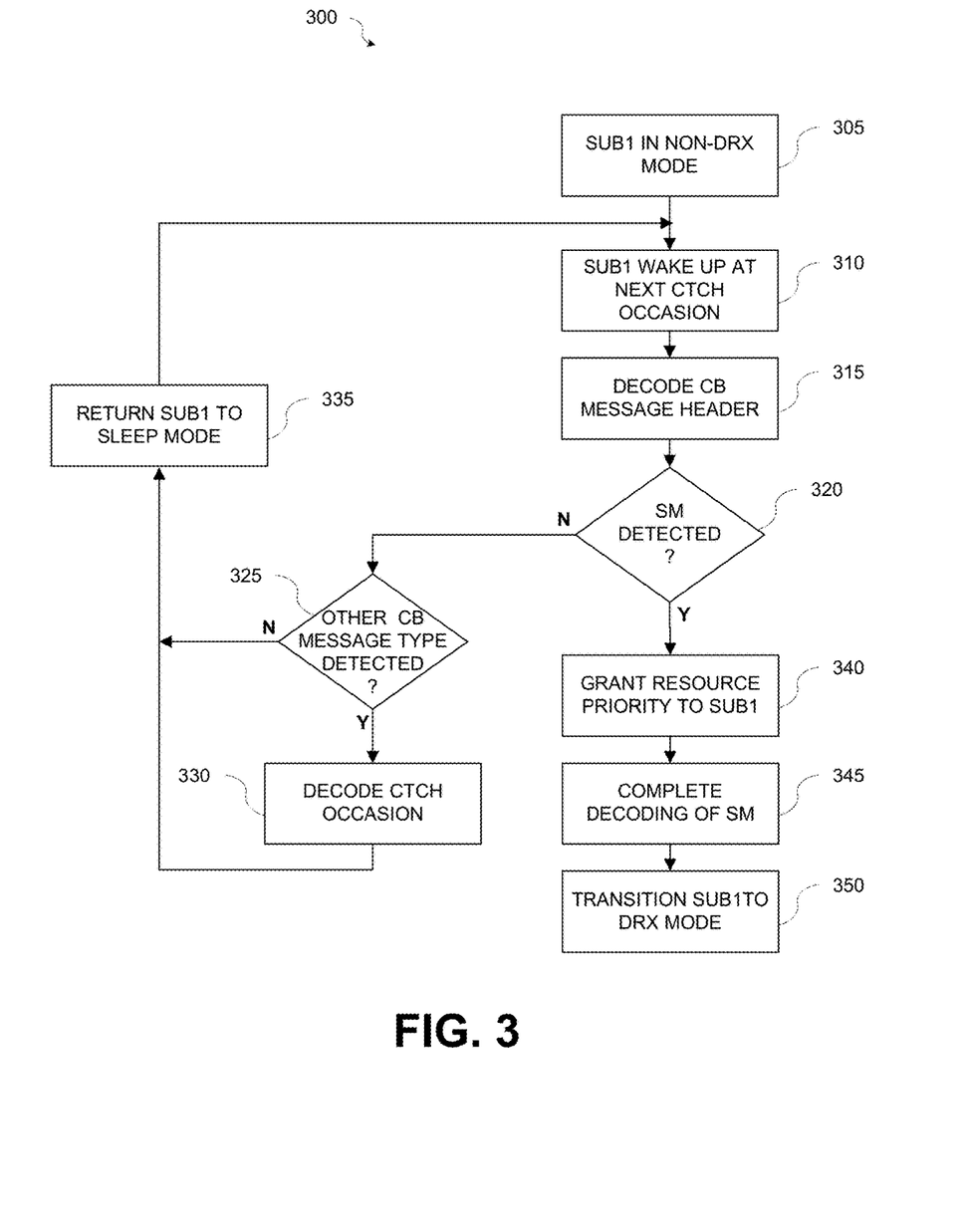
FIG. 3 is a flowchart of a method for transitioning from non-DRX mode to DRX mode according to various embodiments.

FIG. 3 is a flowchart of a method 300 for transitioning from non-DRX mode to DRX mode according to various embodiments. Referring to FIGS. 1A-3, at block 305, a subscription (e.g., Sub1 192) may be in non-DRX mode. At block 310, the control unit 110 may cause Sub1 192 to wake up from sleep mode at a next CTCH occasion. At block 315, the control unit 110 may cause the communication unit 120 to decode a CB message header. At block 320, the control unit 110 may determine whether an SM is detected.

In response to determining that an SM is not detected on Sub1 192 (320-N), at block 325, the control unit 110 may determine whether another CB message type is detected. In response to determining that another CB message type is not detected (325-N), the control unit 110 may transition Sub1 192 to the sleep mode at block 335. In response to determining that another CE message type is detected on Sub1 192 (325-Y), at block 330, the control unit 110 may cause the communication unit 120 to decode the CTCH occasion. After decoding the CTCH occasion, the control unit 110 may transition Sub1 192 to the sleep mode at block 335.

In response to determining that an SM is detected on Sub1 12 (320-Y), the control unit 110 may grant resource priority to Sub1 192 at block 340. For example, the control unit 110 may permit Sub1 192 to utilize the RF chain 135 and/or other resources of the communication unit 120 to enable Sub1 192 to decode the SM without interruption from another subscription (e.g., Sub2 197). At block 345, the control unit 110 may cause the communication unit 120 to complete the decoding of the SM.

In some cases, an SM received on Sub1 192 may overlap with another CB message, for example, a paging message or a non-emergency message, received on of Sub2 197. When an SM and a paging message or non-emergency message overlap, the control unit 110 may completely decode the SM received on Sub1 192. After decoding of the SM is complete, the control unit 110 may cause Sub1 192 to transition to the DRX mode at block 350.

One of ordinary skill in the art will appreciate that other resources of the mobile communication device 100 necessary to decode a CB message may be utilized by a subscription when the subscription is granted resource priority.

In some cases, a subscription (e.g., Sub1 192 or Sub2 197) may be in DRX mode but may not receive a next expected SM, for example, due to cell reselection, voice call activity on the other subscription, an out-of-service (OOS) event, etc. When the next expected SM is not received, the subscription may transition back to non-DRX mode at the end of the CBS scheduling period, and the control unit 110 may again implement the method 300 to return the subscription to DRX mode.

The methods 200 and 300, respectively, may be embodied on a non-transitory computer readable medium, for example, but not limited to, the storage unit 180 or other non-transitory computer readable medium known to those of skill in the art, having stored therein a program including computer executable instructions for making a processor, computer, or other programmable device execute the operations of the methods.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The accompanying claims and their equivalents are intended to cover such forms or modifications as would fall within the scope and spirit of the protection. For example, the example apparatuses, methods, and systems disclosed herein can be applied to multi-SIM wireless devices subscribing to multiple communication networks and/or communication technologies. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc., are not intended to limit the order of the operations; these words are simply used to guide the reader through the description of the methods. Further, any reference to claim elements in the singular, for example, using the articles "a," "an," or "the" is not to be construed as limiting the element to the singular.

The various illustrative logical blocks, modules, circuits, and algorithm operations described in connection with the embodiments disclosed herein may be implemented as electronic hardware, computer software, or combinations of bath. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or stale machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and car computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for supporting emergency cell broadcast (CB) messages on a multi-subscriber identity module (SIM) mobile communication device, the method comprising:
    waking up a first subscription, associated with a first subscriber identity module (SIM), in non-discontinuous receive (non-DRX) mode from a sleep mode at a common traffic channel (CTCH) occasion;
    decoding a CB message header received during the CTCH occasion;
    determining whether a scheduling message (SM) is present based on the decoded CB message header;
    in response to determining that the SM is present, granting resource priority to the first subscription to completely decode the SM without interruption from a second subscription associated with a second subscriber identity module (SIM); and
    transitioning the first subscription to discontinuous receive (DRX) mode after completely decoding the SM.

2. The method of claim 1, further comprising:
in response to determining that the SM is not present, determining whether another CB message type is present based on the decoded CB message header;
in response to determining that another CB message type is present, decoding the CTCH occasion; and
transitioning the first subscription to the sleep mode.

3. The method of claim 2, further comprising:
in response to determining that another CB message type is not present, transitioning the first subscription to the sleep mode.

4. The method of claim 1, further comprising:
determining a CB message type based on the decoded CB message header; and
prioritizing a CB message based on the CB message type.

5. The method of claim 4, wherein the prioritizing the CB message based on the CB message type comprises:
assigning a message priority to the CB message.

6. The method of claim 5, further comprising:
granting resource priority to the first subscription to completely decode the CB message based on the message priority of the CB message.

7. A mobile communication device, comprising:
a transceiver configured to communicate with a plurality of communication networks; and
a processor in electrical communication with the transceiver, the processor configured to:
wake up a first subscription, associated with a first subscriber identity module (SIM), in non-discontinuous receive (non-DRX) mode from a sleep mode at a common traffic channel (CTCH) occasion;
cause the transceiver to decode a cell broadcast (CB) message header received during the CTCH occasion;
determine whether a scheduling message (SM) is present based on the decoded CB message header;
in response to determining the SM is present, grant resource priority for the transceiver to the first subscription to completely decode the SM without interruption from a second subscription associated with a second subscriber identity module (SIM); and
transitioning the first subscription to discontinuous receive (DRX) mode after completely decoding the SM.

8. The mobile communication device of claim 7, wherein in response to determining that the SM is not present, the processor is configured to determine whether another CB message type is present based on the decoded CB message header;
in response to determining that another CB message type is present, the processor is configured to cause the transceiver to decode the CTCH occasion; and
transition the first subscription to the sleep mode.

9. The mobile communication device of claim 8, wherein:
in response to determining that another CB message type is not present, the processor is configured to transition the first subscription to the sleep mode.

10. The mobile communication device of claim 7, wherein the processor is configured to:
determine a CB message type based on the decoded CB message header; and
prioritize a CB message based on the CB message type.

11. The mobile communication device of claim 10, wherein the processor is configured to:
assign a message priority to the CB message.

12. The mobile communication device of claim 11, wherein the processor is configured to:
granting resource priority to the first subscription to completely decode the CB message based on the message priority of the CB message.

13. A method for prioritizing resources for decoding a cell broadcast (CB) message on a multi-subscriber identity module (SIM) mobile communication device, the method comprising:
decoding a message header of the CB message received on a first subscription, associated with a first subscriber identity module (SIM), woke up in a non-discontinuous receive (non-DRX) mode from a sleep mode at a common traffic channel (CTCH) occasion;
determining, based on the decoded CB message header, a CB message type;
based on the CB message type of the CB message, prioritizing resources of the mobile communication device for the first subscription to completely decode the CB message without interruption from a second subscription associated with a second subscriber identity module (SIM); and
transitioning the first subscription to discontinuous receive (DRX) mode after completely decoding the CB message.

14. The method of claim 13, wherein in response to determining that the CB message type of the CB message received on the first subscription is an emergency message, prioritizing the resources of the mobile communication device for the first subscription to completely decode the emergency message before decoding another CB message type on the second subscription.

15. The method of claim 13, wherein in response to determining that the CB message type of the CB message received on the first subscription is a cell broadcast service (CBS) scheduling message (SM), prioritizing the resources of the mobile communication device for the first subscription to completely decode the CBS SM ahead of other CB message types except an emergency CB message type on the second subscription.

16. The method of claim 13, wherein in response to determining that the CB message type of the CB message received on the first subscription is a paging message, prioritizing the resources of the mobile communication device for the first subscription to completely decode the paging message ahead of a non-emergency CB message type on the second subscription.

17. An apparatus for prioritizing resources for decoding a cell broadcast (CB) message on a mobile communication device, the apparatus comprising:
a transceiver configured to communicate with a plurality of communication networks; and
a processor in electrical communication with the transceiver, the processor configured to:
cause the transceiver to decode a message header of the CB message received on a first subscription, associated with a first subscriber identity module (SIM), woke up in a non-discontinuous receive (non-DRX) mode from a sleep mode at a common traffic channel (CTCH) occasion;
determine, based on the decoded CB message header, a CB message type;
based on the CB message type of the CB message, prioritize the resources of the mobile communication device for the first subscription to completely decode the CB message without interruption from a second subscription associated with a second subscriber identity module (SIM); and transition the first subscription to discontinuous receive (DRX) mode after completely decoding the CB message.

18. The apparatus of claim 17, wherein in response to determining that the CB message type of the CB message received on the first subscription is an emergency message, the processor is configured to prioritize the resources of the mobile communication device for the first subscription to completely decode the emergency message before decoding another CB message type on the second subscription.

19. The apparatus of claim 17, wherein in response to determining that the CB message type of the CB message received on the first subscription is a cell broadcast service (CBS) scheduling message (SM), the processor is configured to prioritize the resources of the mobile communication device for the first subscription to completely decode the CBS SM ahead of other CB message types except an emergency CB message type on the second subscription.

20. The apparatus of claim 17, wherein in response to determining that the CB message type of the CB message received on the first subscription is a paging message, the processor is configured to prioritize the resources of the mobile communication device for the first subscription to completely decode the paging message ahead of a non-emergency CB message type on the second subscription.

* * * * *